(12) United States Patent
Stanley

(10) Patent No.: US 6,911,236 B2
(45) Date of Patent: Jun. 28, 2005

(54) METHOD FOR FORMING A CRAFT COATING

(75) Inventor: James M. Stanley, Cumming, GA (US)

(73) Assignee: Plaid Enterprises, Inc., Norcross, GA (US)

( * ) Notice: Subject to any disclaimer, the term of this patent is extended or adjusted under 35 U.S.C. 154(b) by 0 days.

(21) Appl. No.: 10/603,912

(22) Filed: Jun. 25, 2003

(65) Prior Publication Data

US 2005/0008783 A1 Jan. 13, 2005

(51) Int. Cl.$^7$ .................................................. B05D 3/02
(52) U.S. Cl. ................................. 427/389.7; 427/393.6
(58) Field of Search ........................... 427/385.5, 389.7, 427/393.6

(56) References Cited

U.S. PATENT DOCUMENTS

| | | | | |
|---|---|---|---|---|
| 3,769,070 A | | 10/1973 | Schilt ........................... | 117/94 |
| 3,865,774 A | | 2/1975 | Malone ...................... | 260/29.6 |
| 4,039,548 A | | 8/1977 | Malone ............... | 260/29.2 EP |
| 4,054,548 A | | 10/1977 | Malone .................. | 260/37 EP |
| 4,264,640 A | | 4/1981 | Infante .......................... | 427/2 |
| 5,516,453 A | * | 5/1996 | Blankenship .......... | 252/183.11 |
| 5,661,212 A | | 8/1997 | Lear et al. .................. | 524/521 |
| 5,798,426 A | | 8/1998 | Anton et al. ........... | 526/318.41 |
| 5,945,489 A | * | 8/1999 | Moy et al. .................. | 525/471 |
| 6,025,410 A | * | 2/2000 | Moy et al. .................. | 522/182 |
| 6,297,320 B1 | | 10/2001 | Tang et al. ................. | 525/107 |

OTHER PUBLICATIONS

Copyright 2003 Eastman Chemical Company, Product Home, Eastman AAEM (92–Acetoacetosy) Ethyl Methacrylate), www.eastman.com/product_information/producthome.

Copyright by Lonza Group, Ltd, Switzerland, 2000, 2001, Lonzamon®AAEMA PQ, Structure Formula, www.lonza.com; www.polymerintermediates.com/polymer/en/monomers/polymerintermediates0.html.

The Use of Acetoacetoxy–Ethyl Methacrylates (AAEM) in Self–Crosslinking Latex Resins, S. Milinkovic, DUGA Polymers, Duga Holding A.D. Viline Voce 6, Belgrade, (Abstract Only), May 7, 2003.

ECN: Waterbased Crosslinkable Surface Coatings, Richard J. Esser; James E. Devona; Dave E. Setzke; Loek Wagemans; www.coatings.de/articles/esser/esser.htm, Apr. 11, 2003.

\* cited by examiner

*Primary Examiner*—Erma Cameron
(74) *Attorney, Agent, or Firm*—Womble Carlyle Sandridge & Rice, PLLC

(57) ABSTRACT

A method for forming a craft coating on a glass or ceramic substrate is provided. The method generally includes applying a coating composition comprising an acetoacetoxy functional monomer to a glass or ceramic substrate to form a craft coating thereon. The glass or ceramic substrate can form a portion of an article of windows, kitchenwares, decorative housewares, and ceramic tiles.

38 Claims, No Drawings

METHOD FOR FORMING A CRAFT COATING

TECHNICAL FIELD

The present invention generally relates to coatings and methods of their application, and, more specifically, to methods of coating glass, ceramic, tile and other craft-type substrates.

BACKGROUND

The craft industry currently provides various paints and glazes for in-home application on various types of glass, ceramic, tile and other substrates to form craft coatings on these substrates. Since many of the articles that are coated with these paints and glazes are subjected to daily use in the home or workplace, these coatings must be able to withstand repeated cleaning, either in automatic dishwashers or with cleaners that can contain harsh components. For those articles that are cleaned in automatic dishwashers, the coatings must be able to withstand repeated heating, agitation and cleaning with dishwashing detergents without flaking, peeling, discoloration or cracking. In order to form a coating that is durable enough to withstand repeated cleanings, current coating systems generally include a three-step application process. First, a primer is applied to the substrate. Then, a flat intermediate color coat is applied. Finally, a clear protective finish is applied. Generally, to obtain adequate adhesion to the glass or ceramic substrate and provide adequate resistance to dishwashing, only select primers are used. These primers tend to be both solvent-based and toxic. Other types of craft coatings generally exhibit poor performance after repeated cleanings.

Consequently, there is a need for alternative coating systems and methods that are simpler to apply and provide durable coatings on glass, ceramic and tile substrates. It is to the provision of a coative system that addresses this need that the present invention is primarily directed.

SUMMARY

Briefly described, the present invention encompasses a coating system and method that produces a craft coating on glass or ceramic substrates. The substrates coated in the method generally include windows, kitchenwares, decorative housewares, ceramic tiles and other decorative articles. The method of forming a craft coating includes applying to a substrate a coating composition that includes an acetoacetoxy functional polymer. The coating composition, when applied to a glass or ceramic substrate, produces a coating that can withstand repeated cleanings without significant peeling, cracking, flaking or discoloration.

The coating composition applied to a substrate in the method of the invention includes an acetoacetoxy functional monomer. In one embodiment, the acetoacetoxy functional monomer can be selected from acetoacetoxy ethyl methacrylate (AAEM), acetoacetoxy ethyl acrylate (AAEA), acetoacetoxy propyl acrylate (AAPRA), and acetoacetoxy butyl acrylate (AABUA). The coating composition also can include a diluent selected from glycols, water and combinations thereof.

In one embodiment of the method of the invention, a coating composition comprising an acetoacetoxy functional monomer is applied to a glass or ceramic substrate to form a craft coating on the substrate. The substrate can be unprimed and can form a portion of an article selected from windows, kitchenwares, decorative housewares, and ceramic tiles. The method also can include the step of curing the craft coating. Curing can be carried out by exposing the craft coating to ambient air or heating it for a predetermined period of time and at a pre-selected temperature.

These and other aspects of the present invention are set forth in the detailed description provided below.

DETAILED DESCRIPTION

The method of the present invention generally provides a craft coating on glass or ceramic substrates. The craft coating can be formed on a variety of glass or ceramic articles, such as windows, kitchenwares, decorative housewares and ceramic tiles. As used herein, the term "craft coating" refers to a coating that is decorative in nature, i.e. where the primary purpose of the coating is not to protect the underlying substrate. The craft coating can form a decorative design or provide decorative color to the substrate. Generally, the craft coating can be formed directly on a substrate according to the method of the invention without first applying a primer to the substrate.

In one embodiment of the invention, a method for forming a craft coating on a substrate includes the step of providing a glass or ceramic substrate that forms a portion of an article selected from windows, kitchenwares, decorative housewares and ceramic tiles. The glass or ceramic that forms the substrates set forth in the embodiments of the present invention, generally can be any suitable glass or ceramic composition known to those of skill in the art for use in making windows, kitchenwares, decorative housewares, and ceramic tiles manufactured for home use. The articles of kitchenware on which the craft coating can be formed can be any article that generally is used or displayed in a kitchen or dining room. For example, the article of kitchenware can be selected from bowls, plates, cups, saucers, glasses, trays, platters, pitchers, pans, dishes, shakers, tureens, creamers, pots, boats, ramekins, mugs, decanters, flutes, goblets, and snifters. Such articles can be formed of various types of ceramic and glass materials, such as porcelain and crystal. In addition to kitchenwares, articles of decorative housewares also can be coated according to the method of the present invention. For example, the articles of decorative housewares can be selected from picture frames, vases, figurines, mirrors, jewelry boxes, tiles, soap dishes, soap dispensers, tooth brush holders, lamps, ceramic switch plate covers, urns and other housewares. As with the kitchenwares, the decorative housewares can be formed of any suitable glass or ceramic material. In addition to kitchenware and decorative housewares, ceramic tiles and windows can also be coated according to the methods of the present invention.

In one embodiment, the method includes applying a coating composition comprising an acetoacetoxy functional monomer to an unprimed glass or ceramic substrate. The acetoacetoxy functional monomer can be selected from acetoacetoxy ethyl methacrylate, acetoacetoxy ethyl acrylate, acetoacetoxy propyl acrylate, acetoacetoxy butyl acrylate and combinations thereof. One example of a suitable coating composition is the Folk Art® Enamels™, 4006 Engine Red Paint from Plaid Enterprises, Inc., Norcross, Ga. The acetoacetoxy functional monomer allows the coating composition to bind directly to a glass or ceramic substrate without a primer coat being first applied thereto. Application of the coating composition to a glass or ceramic substrate forms a craft coating on the substrate. The step of applying the coating composition to the substrate can be accomplished with a brush, sponge, cloth, stencil, pad, stick or other suitable applicator.

The method can further comprise the step of curing the craft coating on the substrate. Curing can include exposing the craft coating to ambient air. As used herein, the term "ambient air" refers to air that is at normal atmospheric temperature, humidity and pressure at the time and in the locale at which the coated substrate is located, and also includes air that is conditioned by conventional HVAC systems used in buildings. The coating composition can be allowed to cure in ambient air over various ranges of time. The time period can range from a matter of hours to a matter of days, depending upon whether the craft coating is to be heated or allowed to cure completely in ambient air. For example, when the craft coating is completely cured in ambient air, the time period may range from about 17 days to about 25 days. The period of time needed to allow the craft coating to cure can vary significantly from this range depending upon the temperature, pressure and relative humidity of the ambient air, which also can vary significantly depending upon the locale and season in which the curing takes place.

In an embodiment in which curing of the craft coating is carried out by exposing the craft coating to both ambient air and to heat, the craft coating can be exposed to ambient air for a period of time in a range of about 1 to about 2 hours, in which time the craft coating at least dries and can partially cure. Curing also can comprise heating the craft coating. For example, the partial curing of the craft coating in ambient air can be followed by heating in a temperature range of about 300° F. to about 400° F. for about 20 minutes to about 40 minutes. The craft coating is thereby completely cured and generally is resistant to repeated automatic dishwashing and cleaning without flaking, peeling, cracking or color loss.

It will also be understand by those skilled in the art that variations and modifications can be affected within the spirit and scope of the present invention and that the scope of the present invention should only be limited by the claims below.

What is claimed is:

1. A method of forming a craft coating on a substrate, the method comprising:
    applying a coating composition comprising a functional monomer to a substrate to form a craft coating on the substrate,
    wherein the functional monomer comprises an acetoacetoxy functionality and a (meth)acrylate functionality,
    wherein the substrate is selected from glass and ceramic,
    and wherein the coating composition further comprises a diluent selected from water, glycols, and combinations thereof.

2. The method of claim 1, further comprising at least partially curing the craft coating in ambient air.

3. The method of claim 2, further comprising heating the craft coating to further cure the craft coating.

4. The method of claim 3, wherein heating occurs in a temperature range of about 300° F. to about 400° F.

5. The method of claim 3, wherein heating occurs in a range of about 20 minutes to about 40 minutes.

6. The method of claim 2, wherein at least partially curing the craft coating in ambient air occurs in a range of about 1 hour to about 2 hours.

7. The method of claim 1, further comprising completely curing the craft coating in ambient air over a period of time from about 17 to about 25 days.

8. The method of claim 1, further comprising heating the craft coating to cure the craft coating.

9. The method of claim 8, wherein heating occurs in a temperature range of about 300° F. to about 400° F.

10. The method of claim 9, wherein heating occurs in a range of about 20 minutes to about 40 minutes.

11. The method of claim 1, wherein the substrate forms a portion of an article of kitchenware.

12. The method of claim 11, wherein the article of kitchenware is selected from bowls, plates, cups, saucers, glasses, trays, platters, pitchers, pans, dishes, shakers, tureens, creamers, pots, boats, ramekins, mugs, decanters, flutes, goblets, and snifters.

13. The method of claim 1, wherein the substrate forms a portion of an article of decorative houseware.

14. The method of claim 13, wherein the article of decorative houseware is selected from vases, picture frames, figurines, mirrors, jewelry boxes, tiles, soap dishes, soap dispensers, tooth brush holders, lamps, ceramic switch plate covers, and urns.

15. The method of claim 1, wherein the substrate forms a portion of a ceramic tile.

16. The method of claim 1, wherein the functional monomer is selected from acetoacetoxy ethyl methacrylate, acetoacetoxy ethyl acrylate, acetoacetoxy propyl acrylate, acetoacetoxy butyl acrylate and combinations thereof.

17. A method of forming a craft coating on a substrate, the method comprising:
    applying a coating composition comprising a functional monomer to an unprimed substrate to form a craft coating on the unprimed substrate,
    wherein the functional monomer comprises an acetoacetoxy functionality and a (meth)acrylate functionality,
    wherein the unprimed substrate is selected from glass and ceramic,
    and wherein the coating composition further comprises a diluent selected from water, glycols, and combinations thereof; and,
    at least partially curing the craft coating.

18. The method of claim 17, wherein at least partially curing the craft coating is in ambient air.

19. The method of claim 18, wherein at least partially curing the craft coating in ambient air comprises exposing the craft coating to ambient air for a period of time from about 1 hour to about 2 hours.

20. The method of claim 18, wherein at least partially curing the craft coating in ambient air comprises exposing the craft coating to ambient air for a period of time from about 17 days to about 25 days.

21. The method of claim 17, wherein at least partially curing the craft coating further comprises heating the craft coating.

22. The method of claim 21, wherein heating occurs in a temperature range of about 300° F. to about 400° F.

23. The method of claim 21, wherein heating occurs in a range of about 20 minutes to about 40 minutes.

24. The method of claim 17, wherein the unprimed substrate forms a portion of an article of kitchenware.

25. The method of claim 24, wherein the article of kitchenware is selected from bowls, plates, cups, saucers, glasses, trays, platters, pitchers, pans, dishes, shakers, tureens, creamers, pots, boats, ramekins, mugs, decanters, flutes, goblets, and snifters.

26. The method of claim 17, wherein the unprimed substrate forms a portion of an article of decorative houseware.

27. The method of claim 26, wherein the article of decorative houseware is selected from vases, picture frames, figurines, mirrors, jewelry boxes, tiles, soap dishes, soap dispensers, tooth brush holders, lamps, ceramic switch plate covers, and urns.

28. The method of claim 17, wherein the unprimed substrate forms a portion of a ceramic tile.

29. The method of claim 17, wherein the functional monomer is selected from acetoacetoxy ethyl methacrylate, acetoacetoxy ethyl acrylate, acetoacetoxy propyl acrylate, acetoacetoxy butyl acrylate and combinations thereof.

30. A method of forming a craft coating on a substrate comprising:
  providing an unprimed substrate selected from glass and ceramic, wherein the unprimed substrate forms a portion of an article selected from kitchenwares, decorative housewares, ceramic tiles, and windows;
  applying a water-based coating composition comprising an acetoacetoxy functional monomer to the unprimed substrate to form a craft coating on the unprimed substrate, wherein the acetoacetoxy functional monomer is selected from acetoacetoxy ethyl methacrylate, acetoacetoxy ethyl acrylate, acetoacetoxy propyl acrylate, acetoacetoxy butyl acrylate and combinations thereof; and,
  at least partially curing craft coating.

31. The method of claim 30, wherein at least partially curing the craft coating is in ambient air.

32. The method of claim 31, wherein at least partially curing the craft coating in ambient air comprises exposing the craft coating to ambient air for a period of time from about 1 hour to about 2 hours.

33. The method of claim 31, wherein , at least partially curing the craft coating in ambient air comprises exposing the craft coating to ambient air for a period of time from about 17 days to about 25 days.

34. The method of claim 30, wherein at least partially curing the craft coating further comprises heating the craft coating.

35. The method of claim 34, wherein heating occurs in a temperature range of about 300° F. to about 400° F.

36. The method of claim 34, wherein heating occurs in a range of about 20 minutes to about 40 minutes.

37. The method of claim 30, wherein the article is an article of kitchenware selected from bowls, plates, cups, saucers, glasses, trays, platters, pitchers, pans, dishes, shakers, tureens, creamers, pots, boats, ramekins, mugs, decanters, flutes, goblets, and snifters.

38. The method of claim 30, wherein the article is an article of decorative houseware selected from vases, picture frames, figurines, mirrors, jewelry boxes, tiles, soap dishes, soap dispensers, tooth brush holders, lamps, ceramic switch plate covers, and urns.

* * * * *